United States Patent [19]

Tachibana et al.

[11] Patent Number: 5,815,825
[45] Date of Patent: Sep. 29, 1998

[54] VEHICLE GUIDANCE SYSTEM

[75] Inventors: Akihide Tachibana; Keiji Aoki, both of Susono, Japan

[73] Assignee: Toyota Jidosha Kabushiki Kaisha, Toyota, Japan

[21] Appl. No.: 607,027

[22] Filed: Feb. 26, 1996

[30]     Foreign Application Priority Data

Mar. 14, 1995  [JP]  Japan .................................. 7-054271
Jun. 23, 1995  [JP]  Japan .................................. 7-157878

[51] Int. Cl.⁶ ............................................. G06F 165/00
[52] U.S. Cl. ........................... 701/23; 318/587; 180/169
[58] Field of Search ................................. 701/23, 24, 200, 701/301; 180/167, 168, 169; 318/580, 581, 587

[56]               References Cited

U.S. PATENT DOCUMENTS

| | | | |
|---|---|---|---|
| 4,215,759 | 8/1980 | Diaz | 180/168 |
| 4,361,202 | 11/1982 | Minovitch | 180/168 |
| 4,401,181 | 8/1983 | Schwarz | 180/168 |
| 4,656,463 | 4/1987 | Anders et al. | 340/572 |
| 4,908,557 | 3/1990 | Sudare et al. | 318/587 |
| 4,962,457 | 10/1990 | Chen et al. | 701/200 |
| 5,127,486 | 7/1992 | Yardley et al. | 180/168 |
| 5,189,612 | 2/1993 | Lemercier et al. | 701/23 |
| 5,229,941 | 7/1993 | Hattori | 701/26 |
| 5,249,027 | 9/1993 | Mathur et al. | 356/1 |
| 5,289,183 | 2/1994 | Hassett et al. | 340/905 |
| 5,295,551 | 3/1994 | Sukonick | 180/167 |
| 5,331,561 | 7/1994 | Barrett et al. | 364/447 |
| 5,347,456 | 9/1994 | Zhang et al. | 701/23 |
| 5,357,432 | 10/1994 | Margolis et al. | 701/23 |
| 5,369,591 | 11/1994 | Broxmeyer | 701/301 |
| 5,381,095 | 1/1995 | Andrews | 324/326 |
| 5,387,916 | 2/1995 | Cohn | 342/44 |
| 5,416,711 | 5/1995 | Gran et al. | 364/436 |
| 5,420,794 | 5/1995 | James | 701/117 |
| 5,424,726 | 6/1995 | Beymer | 340/902 |
| 5,504,482 | 4/1996 | Schreder | 340/995 |

FOREIGN PATENT DOCUMENTS

| | | |
|---|---|---|
| 1-253007 | 10/1989 | Japan . |
| 2-143608 | 12/1990 | Japan . |
| 5-019854 | 1/1993 | Japan . |
| 5-126591 | 5/1993 | Japan . |

*Primary Examiner*—Gary Chin
*Attorney, Agent, or Firm*—Kenyon & Kenyon

[57]          ABSTRACT

A vehicle running guidance system using magnetic markers for the purpose of reducing the number of magnetic markers to be laid on a road surface. The magnetic nails are laid as magnetic markers on a road. The radio wave generator tags are also laid. The radio wave generator tags transmit road curve data for a distance of about 100 m in the running direction. Power for the radio wave generator tags is supplied from a magnetic generator on a vehicle. On the vehicle, the relative displacement from a magnetic nail is detected by a magnetic sensor, and at the same time the road curve data from radio wave generator tags is received by a radio wave receiving device. The controller determines the amount of steering, based on relative displacement with respect to magnetic nails and road curve data, and supplies it to the actuator. Transmission of road curve data contributes to reducing the number of magnetic nails.

3 Claims, 9 Drawing Sheets

VEHICLE GUIDANCE SYSTEM

BACKGROUND OF THE INVENTION

1. Field of the Invention

The present invention relates to a vehicle guidance system, and more particularly, to a guidance system which uses magnetic markers laid on a road.

2. Description of the Related Art

Up to the present, a variety of guidance systems have been proposed in order to reduce the driving operations for a vehicle driver when running along a expressway or the like.

For instance, the Japanese Patent Laid-Open No. Hei 1-253007 discloses a running control method and its apparatus for an unmanned carrier, in which a technique is disclosed for causing the unmanned carrier to run along the track, with magnets (magnetic markers) disposed at fixed points on a running course, wherein a magnetic field detector detects the magnetic field strength of those magnets, thereby controlling a vehicle to move in the direction that will reduce deviation.

However, in order to accurately detect the deviation of a vehicle on the road, it is necessary to dispose a large number of magnetic markers at closely spaced intervals, which will contribute not only to making the layout work difficult but also to increasing the cost.

SUMMARY OF THE INVENTION

The present invention was conceived, in view of the above stated problems in the prior art, for the purpose of providing a vehicle guidance system which will greatly reduce the number of magnetic markers required to be laid on the road.

In order to achieve the above mentioned purpose, the present invention provides a vehicle guidance system having magnetic generator means laid at the side of a road surface and having, mounted at the side of a vehicle, magnetic detector means for detecting the magnetism from the magnetic generator means, position calculator means for calculating, based on the detected magnetism, the relative position of the vehicle with respect to the road surface, and control means for controlling, based on the calculated relative position, the running of the vehicle, characterized in that the system comprises road curve data transmitter means provided at the road side for transmitting data about the curving of the road which lies in the running direction of the vehicle, and at the side of the vehicle, receiver means for receiving the road curving data from the road curve data transmitter means, and the control means controls the running of the vehicle according to the relative position and road curving data.

It is preferable that the road curve data transmitter means should be either a radio wave generator tag laid on the road, or a beacon installed at the side of the road.

The radio wave generator tags or beacons are installed greater distances apart than the magnetic generator means.

As for the road curving data, transverse deviations from the current road running direction are transmitted for specified distances from the current position. From the beacon, not only the road curving data but also the information about the position of magnetic generator means installed within the signal transmission area are transmitted.

Moreover, in the present invention, excitation means is provided at the front of the vehicle, and an induction coil for generating an induction voltage under the influence of the magnetic field produced by the excitation means is provided in the road curve data transmitter means so that the road curve data transmitter means transmits the road curving data by means of the power generated in the induction coil.

Excitation in the excitation means only occurs when a vehicle passes the magnetic generator means provided in the vicinity of road curve data transmitter means, which contributes to the prevention of wasteful power consumption.

The vehicle is provided with yaw angle detector means, and the magnetic generator means form pairs which are separated by a specified distance in the running direction of the vehicle in the vicinity of the road curve data transmitter means, and the control means initializes the yaw angle detected by the yaw angle detector means when the vehicle passes the pairs of the magnetic generator means.

As described above, in the present invention, the road curving data for the road ahead of the vehicle is transmitted by the road curve data transmitter means so that the road curve can be recognized beforehand at the vehicle. Accordingly, it is possible to guide the vehicle along the curving road without installing a large number of magnetic generator means at small intervals, as has been the case in the past.

Moreover, the road curve data transmitter means has no power source of its own, but is supplied with power from electromagnetic induction caused by the magnetic field which is generated by the exciter means provided on a vehicle, to transmit data. This contributes to eliminating waste when transmitting data even when there is no vehicle running, thereby saving energy, and to reliably sending road curve data to the vehicle.

Moreover, the magnetic generator means form a pair in the vicinity (for instance immediately in front) of the curve data transmitter means, and the yaw angle of the vehicle is thereby initialized. In the area where there is no pair of these magnetic generator means, it is possible, for instance, for the yaw angle to be calculated by means of the integrated value of yaw rate to accumulate errors, which are likely to result in an incorrect yaw angle. However, initialization of the yaw angle in this fashion in the vicinity of the curve data transmitter means makes it possible to obtain a correct relative displacement, yaw angle and curve data, which will increase the accuracy of guidance thereafter.

DESCRIPTION OF PREFERRED EMBODIMENTS

A description shall be given hereunder of the embodiments of the present invention with reference to the drawings.

Figure 1:
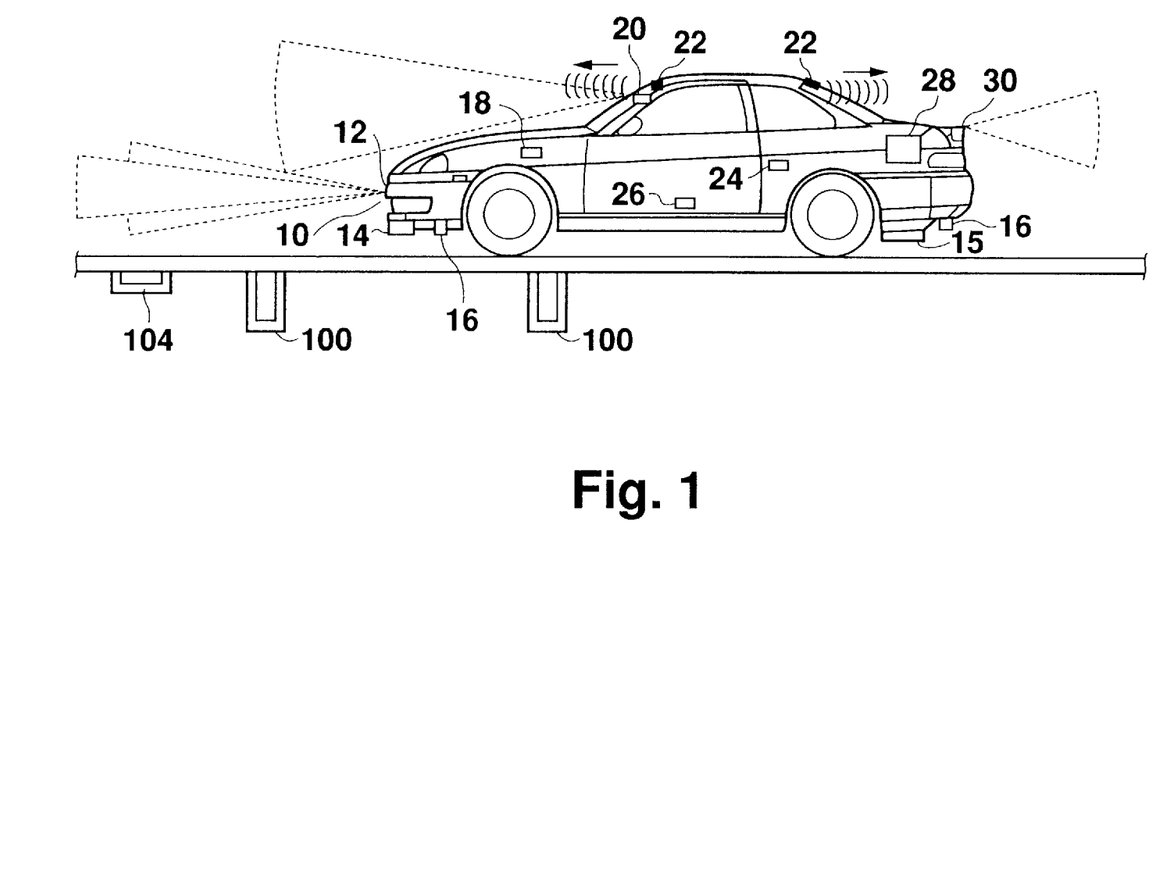
FIG. 1 is a diagram of the system configuration.
Figure 2:
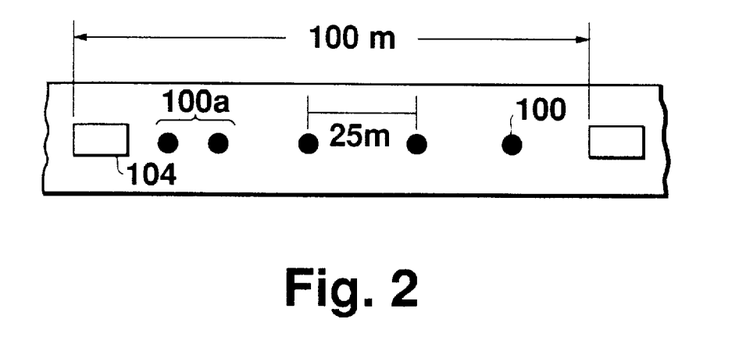
FIG. 2 is a diagram of the positional relationship between magnetic nails and radio wave generator tags.

First embodiment:

FIG. 1 shows the system configuration of the first embodiment. There are magnetic nails 100 laid as magnetic markers at the center of a lane under the surface of a road exclusive to automobiles. There are also radio wave tags 104 installed in the vicinity of the magnetic nails 100. While magnetic nails 100 are laid at a pitch of about 25 m, radio wave tags 104 are installed at a pitch of about 100 m. The data of road curves which lie in the direction where a vehicle is running are transmitted from radio wave tags 104. As illustrated in FIG. 2, magnetic nails 100 are laid immediately in front of radio wave tags 104 in a pair 100a, at a position where they can be detected at the same time by means of magnetic sensors provided in the front and the rear of a vehicle. The significance of the pair 100a shall be described later.

On the other hand, as shown in FIG. 1, on a vehicle there are mounted a short range laser radar 10, for measuring the distance between two vehicles running in tandem, a long range millimeter wave radar 12, for detecting obstacles or the like that lie ahead of the vehicle, a magnetic field generator 14 for supplying power to a radio wave tag 104 provided in the front of the vehicle, a radio wave receiving device 15 for receiving data transmitted from the radio wave tag 104 provided in the rear of the vehicle, magnetic detecting sensors 16, for detecting magnetism from magnetic nails 100 provided in the front and the rear of the vehicle, an actuator 18 for controlling throttle and steering, a forward monitoring CCD camera 20 for detecting obstacles which lie on the road ahead as well as performing car-to-car communication with a vehicle running in front, infrared LEDs 22 for performing car-to-car communication with a vehicle ahead or following behind, a sideway monitoring CCD camera 20, a yaw rate sensor 26 for detecting yaw rate, a controller 28 for controlling steering and speed of the vehicle by inputting signals from each sensor and driving actuator 18 as well as for controlling the car-to-car communication, and a backward monitoring CCD camera 30 for detecting obstacles which lie on the road behind as well as performing the car-to-car communication with a vehicle coming from behind.

In this system configuration, the magnetism of magnetic nails 100 is detected by magnetic detecting sensors 16 provided in the front and the rear of the vehicle, and the relative position with respect to a road surface of the vehicle, i.e. the deviation from the center of a lane, is calculated by controller 28, based on the magnetic field strength. Magnetic detecting sensors 16 provided on the front and the rear of the vehicle form two pairs on pair being disposed on the right, and the other pair on the left from the center line of the vehicle, and the relative displacement is calculated based on the difference in the strength of magnetic fields detected by the right pair and the left pair of magnetic detecting sensors.

Figure 3:
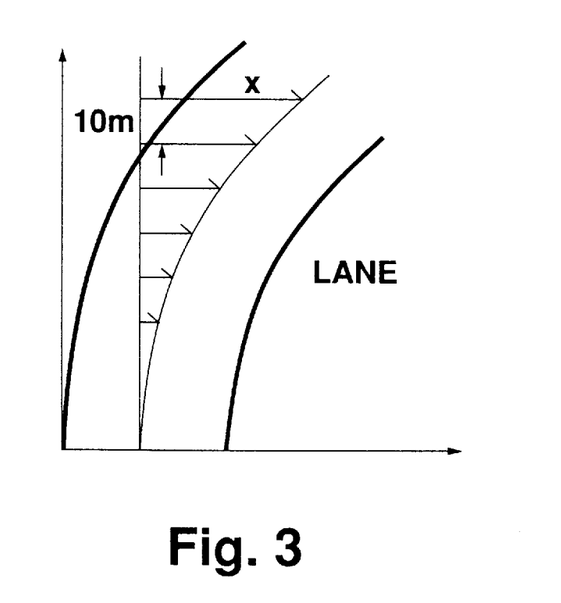
FIG. 3 is a diagram of a road curve data.

Moreover, as illustrated in FIG. 3, the road curve data is transmitted from radio wave generator tag 104 up to 100 m in front, that is, up to the position where the next radio wave generator tag is situated. Specifically, the road curve data is represented as a transverse offset from the direction in which the vehicle is running, at points between the current position and the position where the radio wave generator tag 104 is situated. For instance, an offset is 0 m, 5 m, 10 m . . . for every distance of 10 m from the position where there is radio wave generator tag 104 (in the case of a curved road). Then, the road curve data is received by the radio wave receiving device 15 provided on a vehicle, to be supplied to the controller 28. The controller 28 determines, based on the calculated relative displacement (deviation) and the road curve data, optimum steering to guide a vehicle to the center of a lane, and supplies control signals to an actuator 18. In this way, even on a section of a road where there is no magnetic nails, a vehicle can be guided according to the road curving data of the section. It is conceivable, for instance, that an expected running course which a vehicle must take to converge to the center of a lane (the center of a lane assumed from the road curving data) may be calculated by means of an operation according to the relative position, as well as the road curving data at the time, so as to control steering for the vehicle to run along that course. To put it another way, in this system, since a single radio wave generator tag 104 performs a function as well as if it were a plurality of magnetic markers which were laid out at a specified spacing, as has been the case in the past, the number of magnetic nails can be reduced to a large extent. In view of the above, it can be considered that there will be no need in principle for magnetic nails to be placed in a section between wave generator tags 104. However, as illustrated in FIG. 2, the present embodiment has magnetic nails laid at a spacing of 25 m even in a section between wave generator tags 104. They are laid for the use of checking the accuracy of guidance when a vehicle is guided according to the road curve data. In the past, because the curving of a road was unknown, it was necessary to lay magnetic nails at a closer pitch. In this embodiment, however, magnetic nails are used only for checking the accuracy of guidance, and they may be laid at a larger spacing than before, resulting in a reduction in the number of magnetic nails laid.

Figure 4:
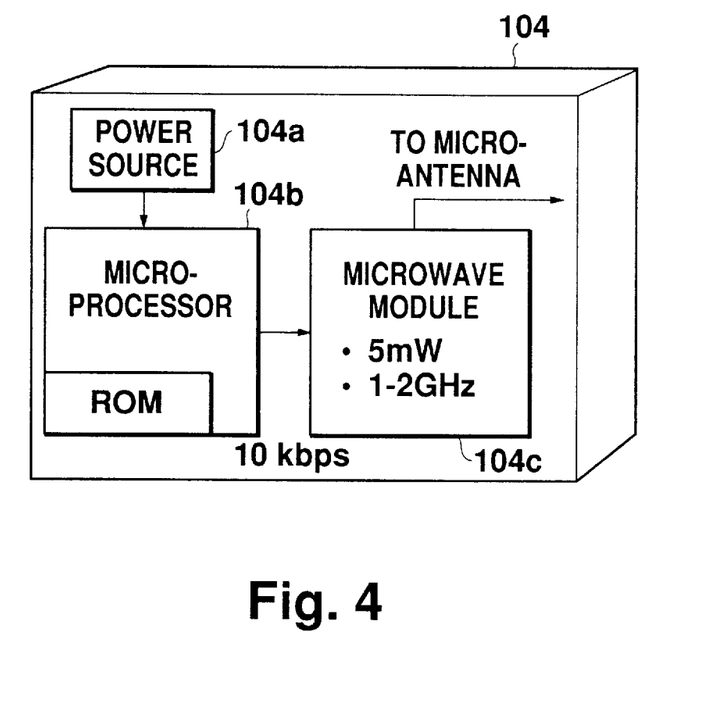
FIG. 4 is a diagram of a radio wave generator tag.

On the other hand, FIG. 4 shows the configuration of a radio wave generator tag 104 of the present embodiment. The radio wave generator tag 104 includes a power source 104a which incorporates an induction coil, a microprocessor 104b having a ROM which stores the road curving data indicated in FIG.3, and a microwave module 104c having a modulator for modulating the road curving data and outputting it to a micro-antenna. Power to the microprocessor 104b is supplied from a power source 104a. The power source 104a does not generate power by itself, but generates power through electromagnetic induction by the magnetic field of the magnetic generator 14 mounted in the front of a vehicle. Accordingly, the radio wave generator tag 104 does not operate at all when there is no vehicle passing, but starts operating only when there is a vehicle passing, thus transmitting road curving data to the vehicle. By the way, it may be composed, for instance, so that the size of radio wave generator tag 104 is 10×6×1.0 cm, the power is 50 mW, the road curve data is transmitted at 10 kbps, and the power consumption of the microwave module 104c is 5 mW with output microwaves of 1–2 GHz.

Figure 5:
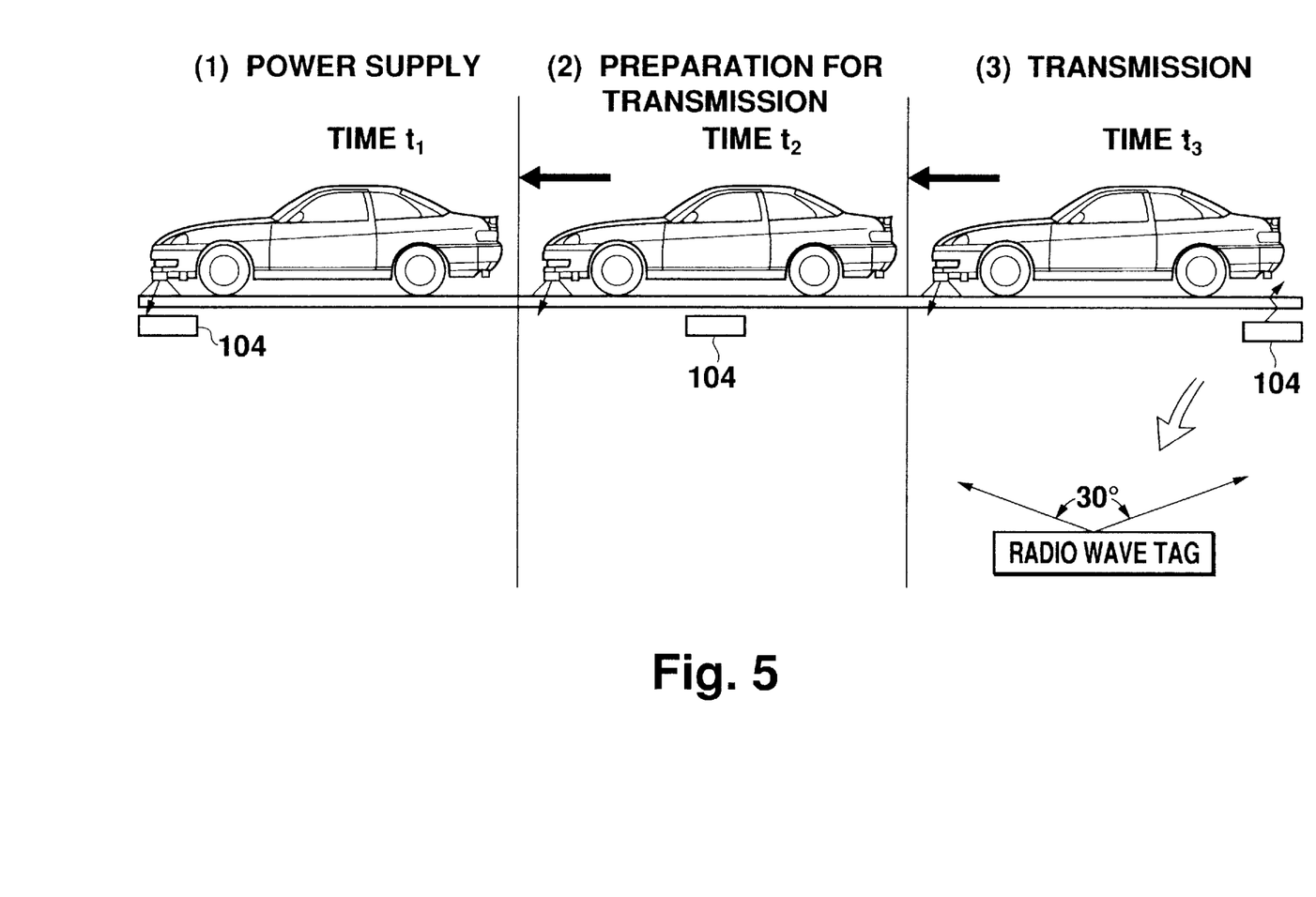
FIG. 5 is a diagram of the timing for power supply from a vehicle and reception of data.

FIG. 5 shows the positioned relationship between a vehicle and a radio wave generator tag 104 as well as the timing of operations of a radio wave generator tag 104. As described above, there is a pair 100a of magnetic nails laid just in front of radio wave generator tag 104. As magnetic sensors 16 mounted on a vehicle simultaneously detect the pair 100a of magnetic nails, the controller 28 generates a high frequency magnetic field by actuating the magnetic generator 14 [FIG. 5 (1)]. The high frequency magnetic field causes the power source 104a of the radio wave generator tag 104 to generate an induction voltage. The power causes the microprocessor 104b of the radio wave generator tag 104 to startup, and preparation for transmission is performed, initializing the equipment and reading out the road curve data stored in ROM 104b [FIG. 5 (2)]. Then, the road curve data is transmitted from a micro-antenna (at a transmission angle of about 30 degrees), and the radio waves of this transmission are received at the vehicle by the radio wave receiving device 15 mounted on the rear thereof [FIG. 5 (3)].

Figure 6:
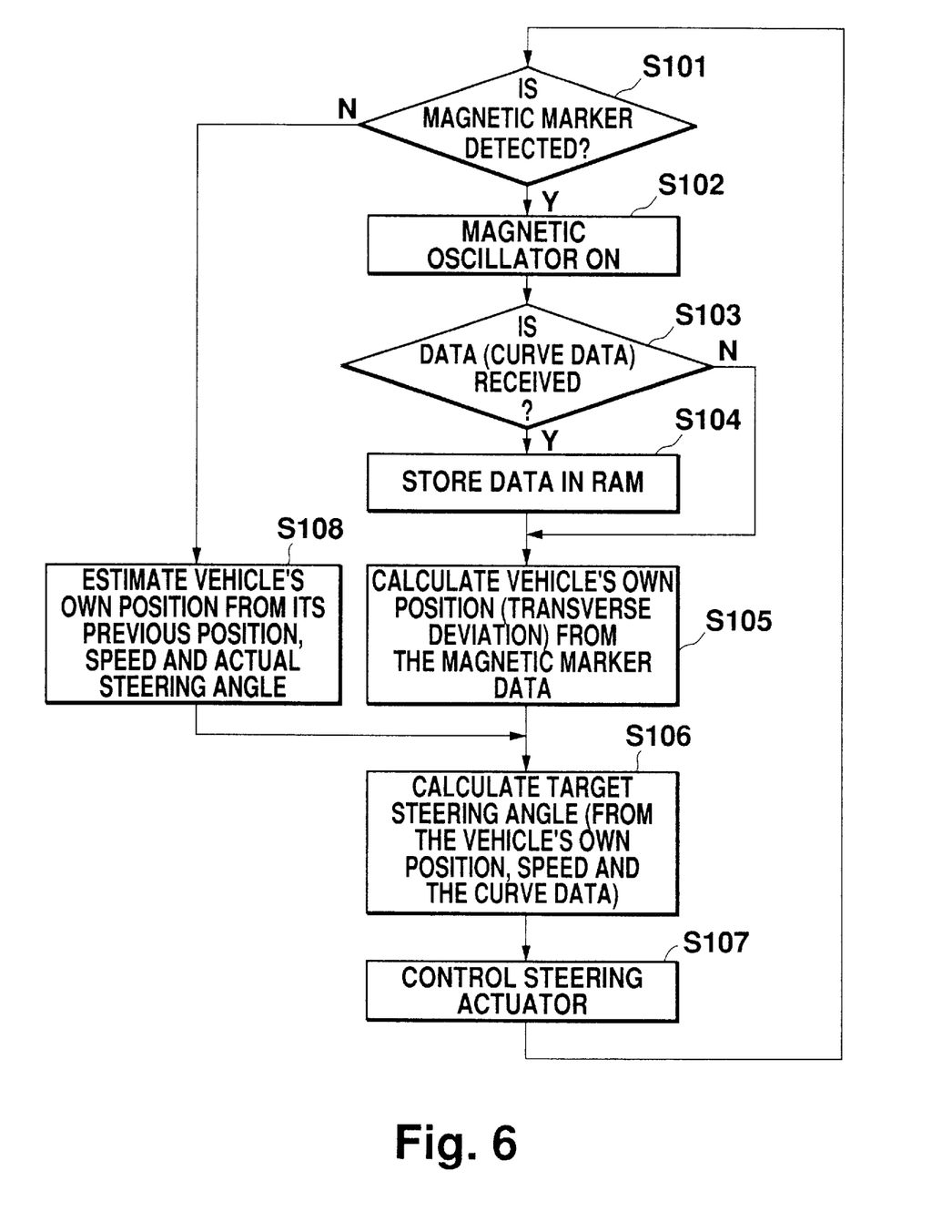
FIG. 6 is a process flow diagram in the first embodiment of the present invention.

FIG. 6 shows the flow chart of the processes described above which are performed in the vehicle. By the way, the magnetic generator 14 is principally actuated when magnetic nails pair 100a are detected, that is to say, the pair 100a of magnetic nails are used as a trigger to generate a magnetic field. However, it is also possible simply to cause the magnetic generator 14 to actuate every time magnetic nails 100 are detected (this is likely to be effective in a case where a pair of magnetic nails cannot be formed immediately in front of radio wave generator tag 104 due to a curved road). The flow chart shows an example of this case. First, the controller 28 decides whether a magnetic field of the magnetic nails 100 has been detected by the magnetic sensor 16 (S1O1). If the magnetic nails 100 have been detected, the magnetic generator (oscillator) 14 is actuated to generate a high frequency magnetic field (S102). If road curve data is transmitted from the radio wave generator tag 104, it is received (S103) and stored in a RAM (S104). Then, the relative displacement from the magnetic nails 100 is calculated (S105). From the relative displacement and the posture angle (yaw angle) of a vehicle, the position of the vehicle relative to the magnetic nails is determined. The yaw angle can be obtained by integrating the value indicated by the yaw rate sensor 26. On the other hand, if magnetic nails 100 have not been detected, the vehicle's own position is to be estimated from the previous position, speed, steering angle and the road curving data last received from the radio wave generator tag 104 (S1O8). Then, based on the calculated vehicle's own position, a target steering angle for guiding the vehicle to the center of a lane is computed (S106). The target steering angle is calculated in two steps: first, a running course for a vehicle to take in order to converge to the center of a lane is worked out from the road curve data to generate steering angle data as a function of position, and then, a target steering angle at the vehicle's current position, which was detected or estimated by calculation, is calculated so that the vehicle will travel along the running course. After the target steering angle has been determined, the controller 28 controls the steering actuator so as to realize driving along the running course.

As described above, in this embodiment, since the road curving data is transmitted by means of the radio wave generator tag 104, the number of magnetic nails to be laid can be reduced to a great extent. In addition, since the power to actuate the radio wave generator tags is supplied from a vehicle, the configuration of radio wave generator tags can be simplified, with the size thereof being made much smaller.

Second embodiment:

In the first embodiment described above, a vehicle basically recognizes the existence of the radio wave generator tag 104 by detecting the pair of magnetic nails 100a which are formed immediately in front of the radio wave generator tag 104 (that is, the magnetic generator 14 is actuated when the pair of magnetic nails 100a are detected by means of magnetic sensors 16 mounted in the front and rear of a vehicle). The pair of magnetic nails 100a can also be used for reset timing of the yaw angle which is obtained by integrating the value detected by the yaw rate sensor 26. This embodiment shows an example in which a pair of magnetic nails is used in order to correctly detect a yaw angle.

The system configuration for this embodiment is the same as that for the first embodiment shown in FIGS. 1 and 2. A pair of magnetic nails 100a are formed at a position immediately in front of the radio wave generator tag 104 where they can be simultaneously detected by magnetic sensors 16 which are mounted in the front and rear of a vehicle. The yaw rate sensor 26 detects a yaw rate at a specified timing and outputs it to the controller 28 which integrates the value thereof and works out a yaw angle. If there are any errors occurring in the yaw rate, it is likely that they will accumulate so that a correct yaw angle cannot be obtained. Accordingly, with a view to the fact that a yaw angle of a vehicle is precisely determined when the pair of magnetic nails 100a are simultaneously detected by magnetic sensors 16 which are mounted in the front and rear of the vehicle, the value of a yaw angle is to be initialized by this timing. To put it in another way, letting the value $\phi$ of a yaw angle when a pair of magnetic nails 100a are simultaneously detected be the initial value of yaw angles to be calculated thereafter will make it possible to eliminate the influence from errors and to enhance the accuracy of yaw angles thereafter.

Figure 7:
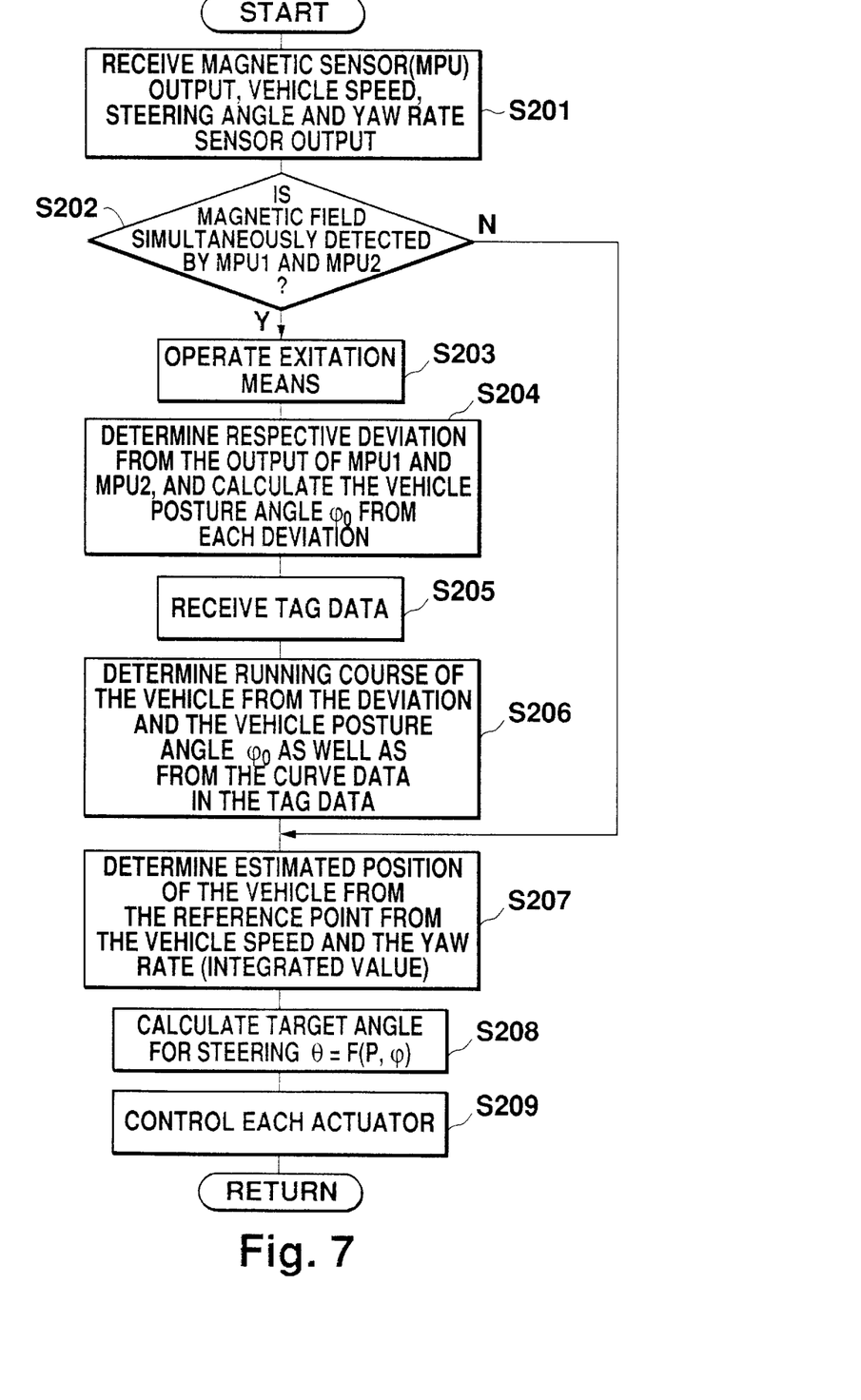
FIG. 7 is a process flow diagram using the initialization of a yaw angle in the second embodiment of the present invention.

FIG. 7 shows the flow chart of the processes in this embodiment. The controller 28 performs an input of the output signals from magnetic sensors 16 mounted in the front and rear of a vehicle as well as of the current vehicle speed v, steering angle $\theta$, and yaw rate $d\phi/dt$ (S201). Then, it decides whether magnetic sensors (let them be temporarily called MPU 1 and MPU 2) mounted in the front and rear of a vehicle have simultaneously detected a magnetic field (S202), and if the detection is simultaneous, the magnetic generator 14 is put into operation to perform excitation, as is fully described in the first embodiment (S203). Also, the controller 28 detects respective deviation from the outputs of MPU 1 and MPU 2, and calculates, from each deviation, a yaw angle $\phi 0$, which is an angle indicating the attitude of a vehicle (S204). After the initial yaw angle $\phi 0$ has been calculated, the controller 28 perform an input of the road curve data from the radio wave generator tag 104 (S205), computes and determines, the running course for a vehicle to take in order to converge to the center of a lane using the deviation (relative displacement) e from the magnetic nails and the yaw angle $\phi 0$ of a vehicle as well as the received road curve data (S206). The running course is given as a function, for instance, of the position p and the yaw angle $\phi$ at the time, as follows:

$$\theta = F(p, \phi) \tag{1}$$

Now, let the time be time T=0, for the sake of convenience, when a vehicle passes the point where there are radio wave generator tags 104, and when the initial yaw angle $\phi$ and the vehicle's running course are determined.

Then, at the time of T (T>0), an estimated position P T from the reference point (i.e. the point where there are radio wave generator tags 104) is calculated based on the current vehicle speed and yaw rate, and at the same time a yaw angle $\phi$T of the vehicle as against the reference point is calculated (S207). The yaw angle $\phi$T is calculated as follows:

$$\phi T = \phi T - 1 + T\, d\phi/dt \tag{2}$$

Obviously, with the value at the time of T=0, what is calculated is a yaw angle $\phi 0$ which is determined correctly and precisely. After the estimated position P T and the yaw angle $\phi$T of the vehicle at the time of T are determined, in order to realize driving along the running course for the vehicle which was determined in S206, a target steering angle $\theta$T at that position is calculated as follows:

$$\theta T = F\,(PT,\, \phi T) \tag{3}$$

Then, the vehicle is driven along the running course by controlling the actuator 18 to achieve the target steering angle (209).

Figure 8:
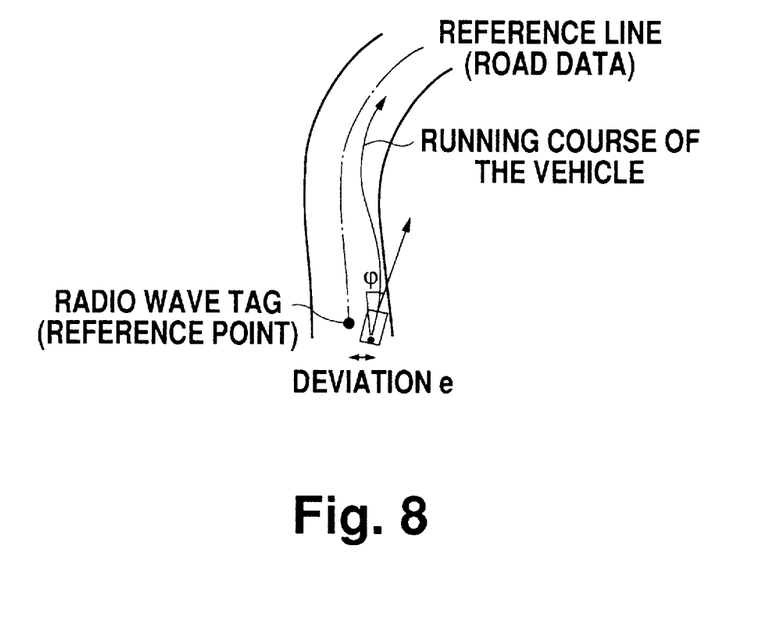
FIG. 8 is a diagram of the running course for a vehicle in the second embodiment of the present invention.

FIG. 8 illustrates an example of the deviation (relative displacement), the yaw angle and the running course of a vehicle at the position (reference point) of radio wave generator tags when curved road data has been transmitted from the radio wave generator tags as the road curve data. If there is a curved road ahead of the radio wave generator tags, the controller 28 takes the radius thereof into consideration and determines a running course. The yaw angle φ0 is not calculated by means of an integrated value of the yaw rate, but is a measured value at the time when a pair of magnetic nails 100a are simultaneously detected, so that it is not affected by accumulated errors and can be determined extremely accurately, and accordingly, the running course which is determined based on that yaw angle is also determined extremely accurately.

Third embodiment:

In the first and second embodiments described above, radio wave generator tags which are laid under a road surface are illustrated for the road curve data transmitter means. They may be replaced with beacons (optical beacons or radio beacons) which are to be installed at the side of a road to transmit road curving data.

Figure 9:
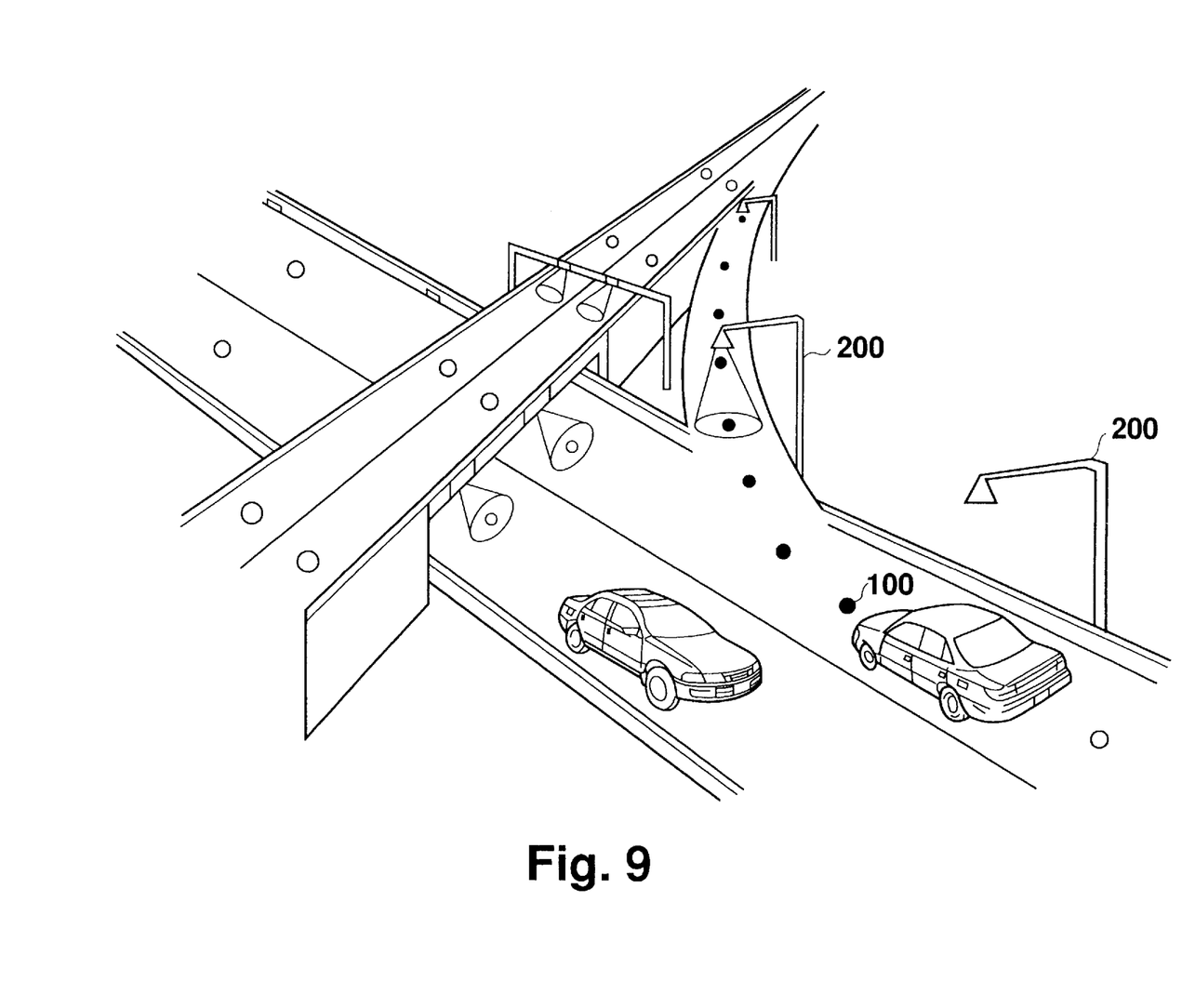
FIG. 9 is a diagram of the system conception using the beacons in the third embodiment of the present invention.

FIG. 9 shows the system configuration in this embodiment. Magnetic nails 100 are laid under a road surface as magnetic markers, and at the side of the road optical beacons 200 are installed to transmit road curve data. Magnetic nails 100 are laid at a pitch of about 25 m, and optical beacons 200 at a pitch of about 100 m. Optical beacons 200 transmit to vehicles not only road curve data but also a variety of traffic information (such as information about traffic congestion, the existence of vehicles going to join a junction, and the like).

In the case of radio wave generator tags, they have to be laid at positions other than those for magnetic nails. In the case of optical beacons, however, the areas which they irradiate may be shared with magnetic nails 100. In FIG. 9, there are illustrated optical beacons together with their areas of irradiation, also indicating the existence of magnetic nails 100 within the irradiation areas. Since it is possible for the irradiation areas to be set at the same position as for magnetic nails 100, the optical beacons in this embodiment transmit not only road curve data but also information about the absolute position of magnetic nails 100 in the running direction of a vehicle within the irradiation areas. Thus, on the part of a vehicle, a relative displacement from the magnetic nails 100 is detected, and also an absolute position of the magnetic nails 100 is received from the optical beacons, which makes it possible for a vehicle to easily recognize its own position with respect to the road surface.

Figure 10:
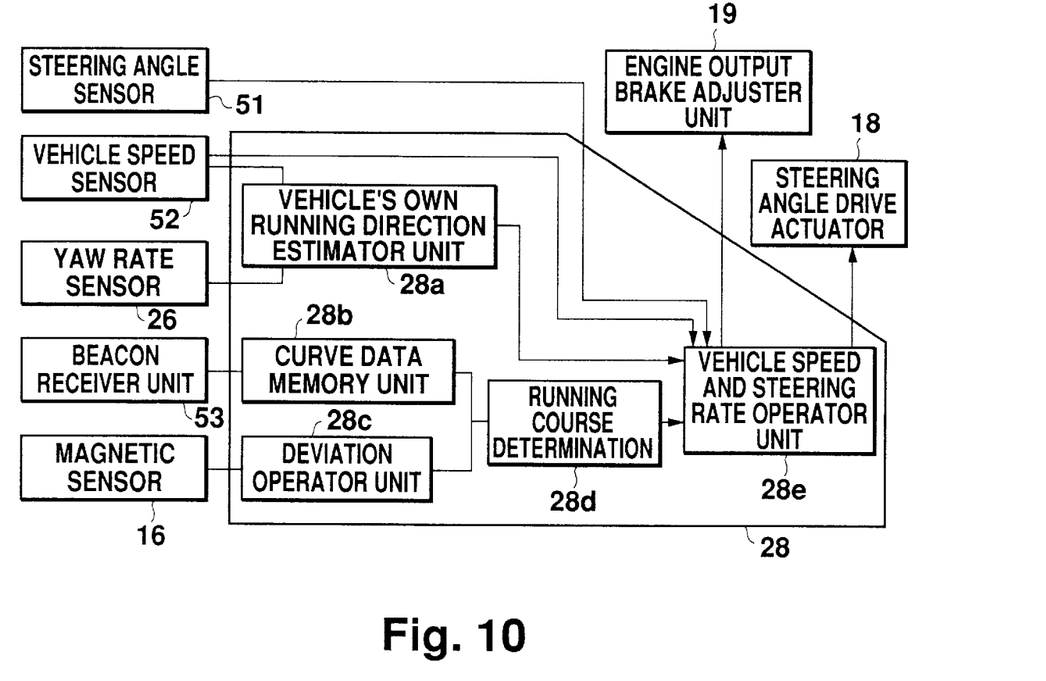
FIG. 10 is a block diagram for the configuration of a vehicle in the third embodiment of the present invention.

FIG. 10 shows the block diagram in this embodiment of the configuration at the side of a vehicle. Detection signals from a steering sensor (wheel steering angle sensor) 51, a vehicle speed sensor 52, a yaw rate sensor 26, a beacon receiver unit 53 and a magnetic sensor 16 are supplied to the controller 28. As described in the second embodiment, a vehicle's own estimated position at the time T is calculated, based on the vehicle speed and the yaw rate, by a vehicle's own running direction estimator unit 28a in the controller 28. Moreover, the road curve data output from the beacon receiver unit 53 are input into a road curving data memory unit 28b and stored therein, and the signals from the magnetic sensor 16 are input into a deviation operator unit 28c for the calculation of a deviation, that is, a relative displacement. Both of the road curving data and the deviation (relative displacement) are input in a running course determiner unit 28d for the determination of a running course for a vehicle to go along so as to converge to the center of a lane. Based on the output from a wheel steering sensor 51, the vehicle's own estimated position data from the vehicle's own running direction estimator unit 28a, and the running course data from the running course determiner unit 28d, the vehicle speed and steering angle operator unit 28e determines a target steering angle and speed in the same process as in the case of the second embodiment. The target steering angle is output to an actuator 18, and the speed is output to an engine output brake adjusting unit 19. Moreover, the vehicle's own running direction estimator unit 28a, deviation operator unit 28c, running course determiner unit 28d and vehicle speed and steering angle operator unit 28e may be configured in a CPU, and the road curve data memory unit 28b may be configured in a RAM.

As described above, according to this invention, it is possible to recognizes the forward road curve by means of a road curve data transmitter, which eliminates the necessity to lay magnetic generator means at a small pitch as in the past, contributing to greatly simplifying the system. Moreover, it is not necessary, in principle, to lay magnetic generator means under a road surface between the road curve data transmitter means. However, they may be laid there at a larger pitch than in the past, for the purpose of checking the guidance of a vehicle so as to further enhance the guiding accuracy.

The position of magnetic generator means is transmitted by the beacon means which enables a vehicle to detect its own position with respect to the road more precisely. The guidance of a vehicle can be performed based on this information about its position, even if a magnetic detector means should fail to function properly for any reason.

Moreover, a supply of power from the side of a vehicle to a road curve data transmitter means contributes to making a more simplified configuration of a road curve data transmitter means as well as to preventing unnecessary transmission while there is no vehicle passing.

The capability of initializing a yaw angle of a vehicle by means of a pair of magnetic generators makes it possible to prevent accumulated errors from occurring, which results in an enhanced accuracy in the guidance thereafter.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A vehicle guidance system comprising:

(a) a magnetic generator means laid on a road;

(b) road curve data transmitting means laid on the road to transmit road curve data in the running direction of a vehicle, wherein said road curve data transmitting means are beacons installed at the side of the road, said beacons are installed at a larger pitch than that of said magnetic generator means to transmit not only said data on the road curve but also the data on the position of the magnetic generator means laid within signal transmission areas;

(c) magnetic detector means mounted on a vehicle to detect magnetism from said magnetic generator means;

(d) position calculating means mounted on the vehicle to calculate, based on the magnetism detected by said magnetic detector means, the relative position to the road surface;

(e) receiver means mounted on the vehicle to receive the road curve data from said road curve data transmitting means; and (f) control means mounted on the vehicle to control the running of a vehicle, based on the relative position calculated by said position calculator means and the road curve data received by said receiver means.

2. A vehicle guidance system comprising:

(a) a magnetic generator means laid on a road;

(b) road curve data transmitting means laid on the road to transmit road curve data in the running direction of a vehicle, wherein said road curve data transmitting means are beacons installed at the side of the road, said beacons are installed at a larger pitch than that of said magnetic generator means to transmit not only said data on the road curve but also the data on the position of the magnetic generator means laid within signal transmission areas;

(c) magnetic detector means mounted on a vehicle to detect magnetism from said magnetic generator means;

(d) position calculating means mounted on the vehicle to calculate, based on the magnetism detected by said magnetic detector means, the relative position to the road surface;

(e) receiver means mounted on the vehicle to receive the road curve data from said road curve data transmitting means; and (f) control means mounted on the vehicle to control the running of a vehicle, based on the relative position calculated by said position calculator means and the road curve data received by said receiver means, wherein said vehicle has excitation means in the front thereof, and said road curve data transmitting means has an induction coil for generating induction voltage under influence of the magnetic field produced by said excitation means, and said road curve data transmitting means transmits said road curve data using the power generated in said induction coil.

3. The system according to claim 2, wherein said excitation means generates a high frequency magnetic field when the vehicle passes the magnetic generator means laid in the vicinity of said road curve data transmitting means.

* * * * *

UNITED STATES PATENT AND TRADEMARK OFFICE
CERTIFICATE OF CORRECTION

PATENT NO. : 5,815,825
DATED : September 29, 1998
INVENTOR(S) : Akihide Tachibana, et al.

It is certified that error appears in the above-indentified patent and that said Letters Patent is hereby corrected as shown below:

| Column | Line | |
|---|---|---|
| 1 | 12 | Before "expressway" change "a" to --an--. |
| 3 | 48 | Change "pairs on pair" to --pairs, one pair--. |
| 4 | 2 | Change "there is no" to --there are no--. |
| 4 | 20 | Change "use" to --purpose--. |
| 5 | 2 | Change "\|FIG. 5(3)\|" to --[FIG. 5(3)]--. |
| 5 | 16 | Change "(S1O1)" to --(S101)--. |
| 5 | 30 | Change "(S1O8)" to --(S108)--. |
| 6 | 13 | Before "another" delete "in". |
| 6 | 33 | Change "perform" to --performs--. |
| 6 | 35 | After "determines" delete ",". |
| 8 | 16 | Change "recognizes" to --recognize--. |

Signed and Sealed this

Second Day of November, 1999

Attest:

Q. TODD DICKINSON

*Attesting Officer*       *Acting Commissioner of Patents and Trademarks*